Figure 1:
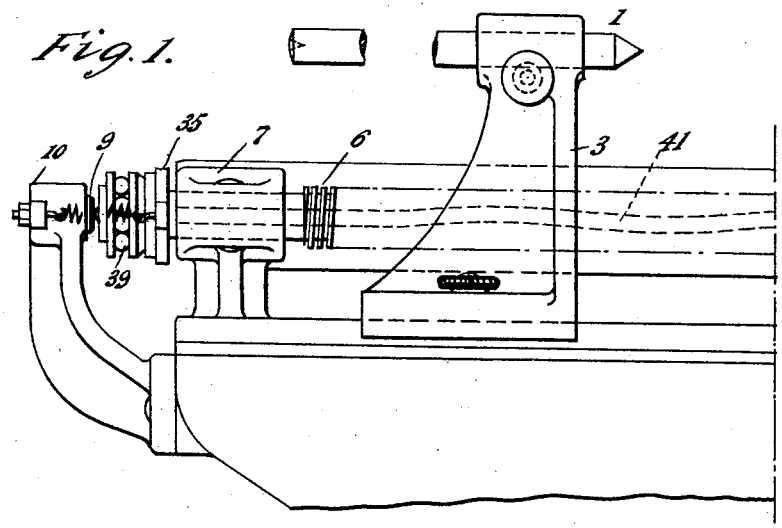

H. W. PUGH AND C. H. VIDAL.
DEVICE FOR TESTING THE PITCH OF SCREWS.
APPLICATION FILED NOV. 20, 1917.

1,332,065.

Patented Feb. 24, 1920.
5 SHEETS—SHEET 1.

Witnesses:

Inventors
Harcourt W. Pugh
Charles H. Vidal
by
Attorney

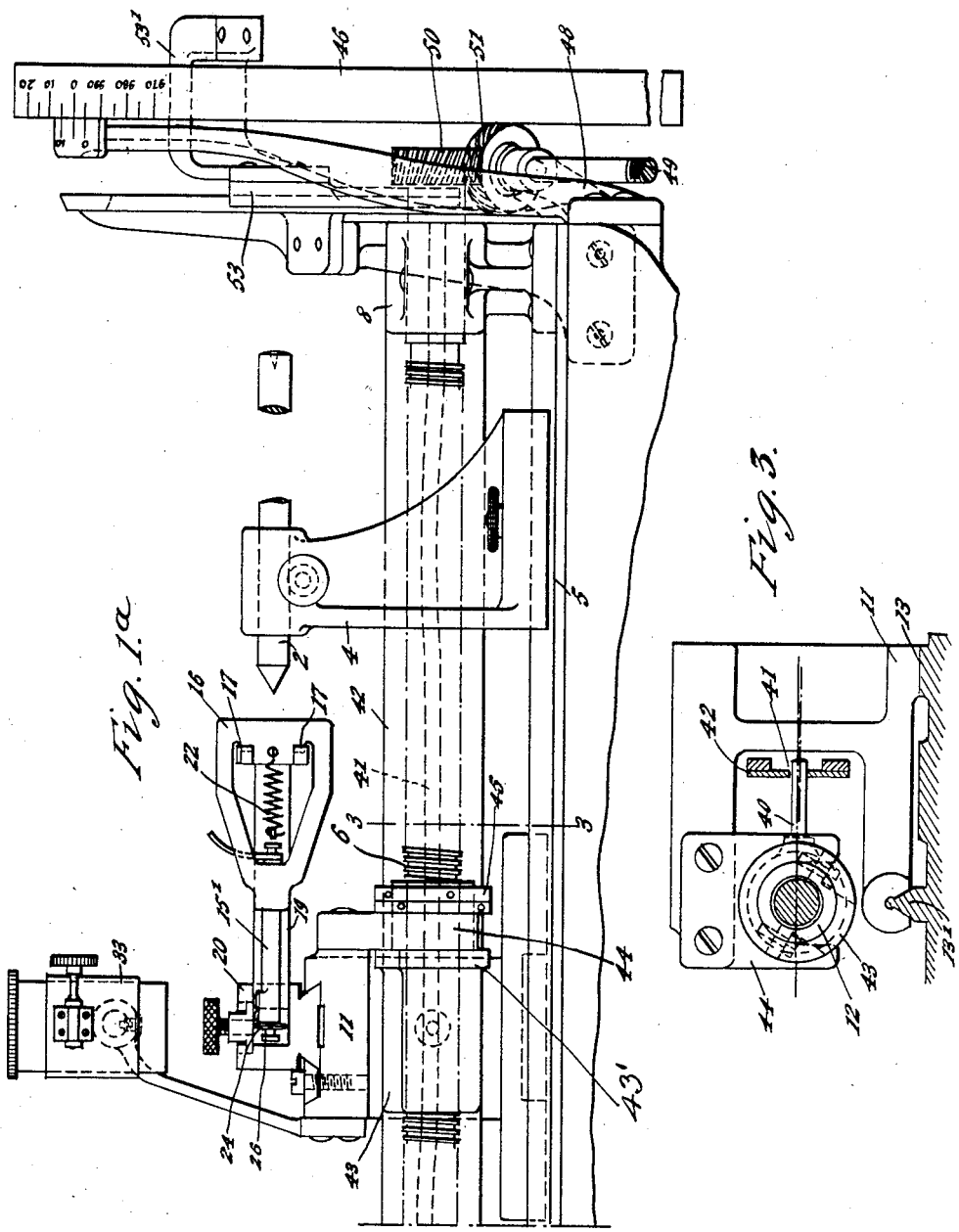

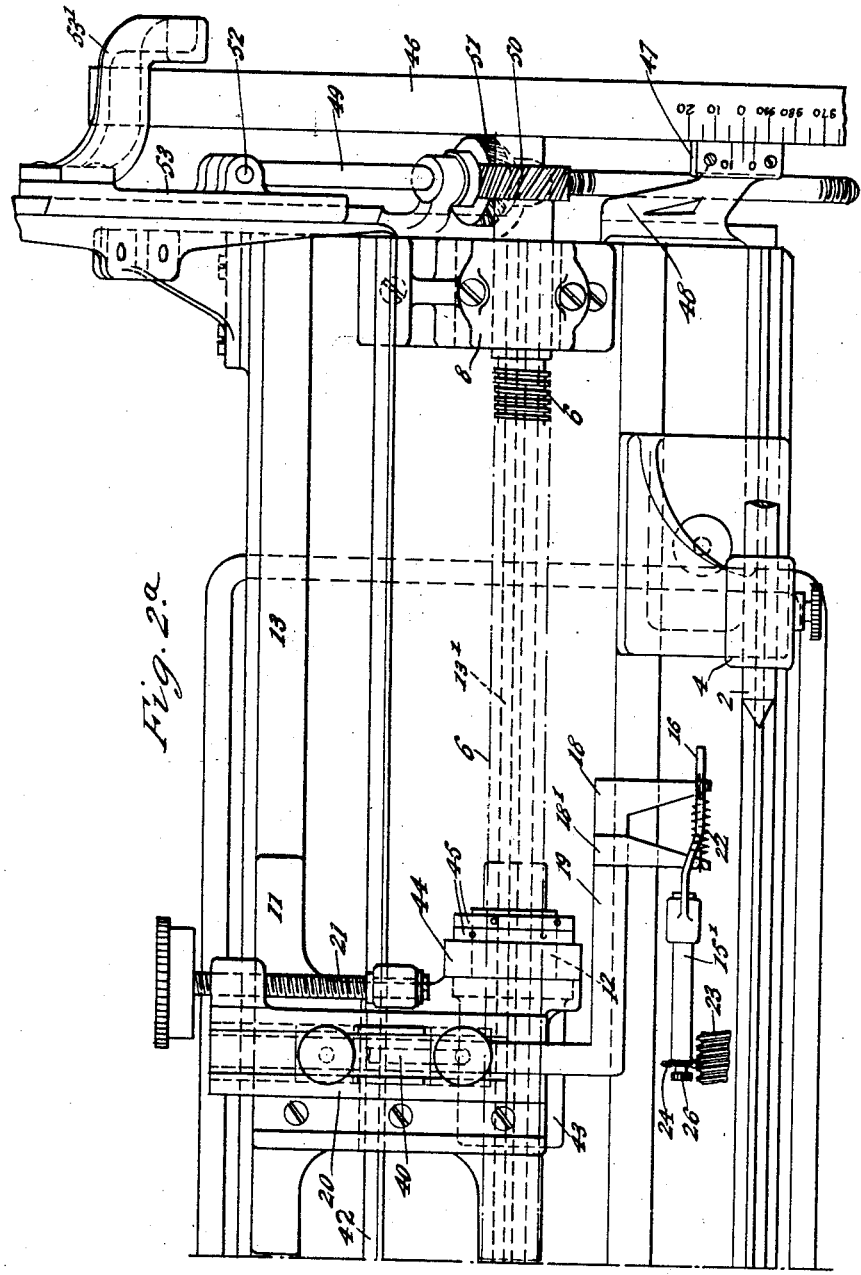

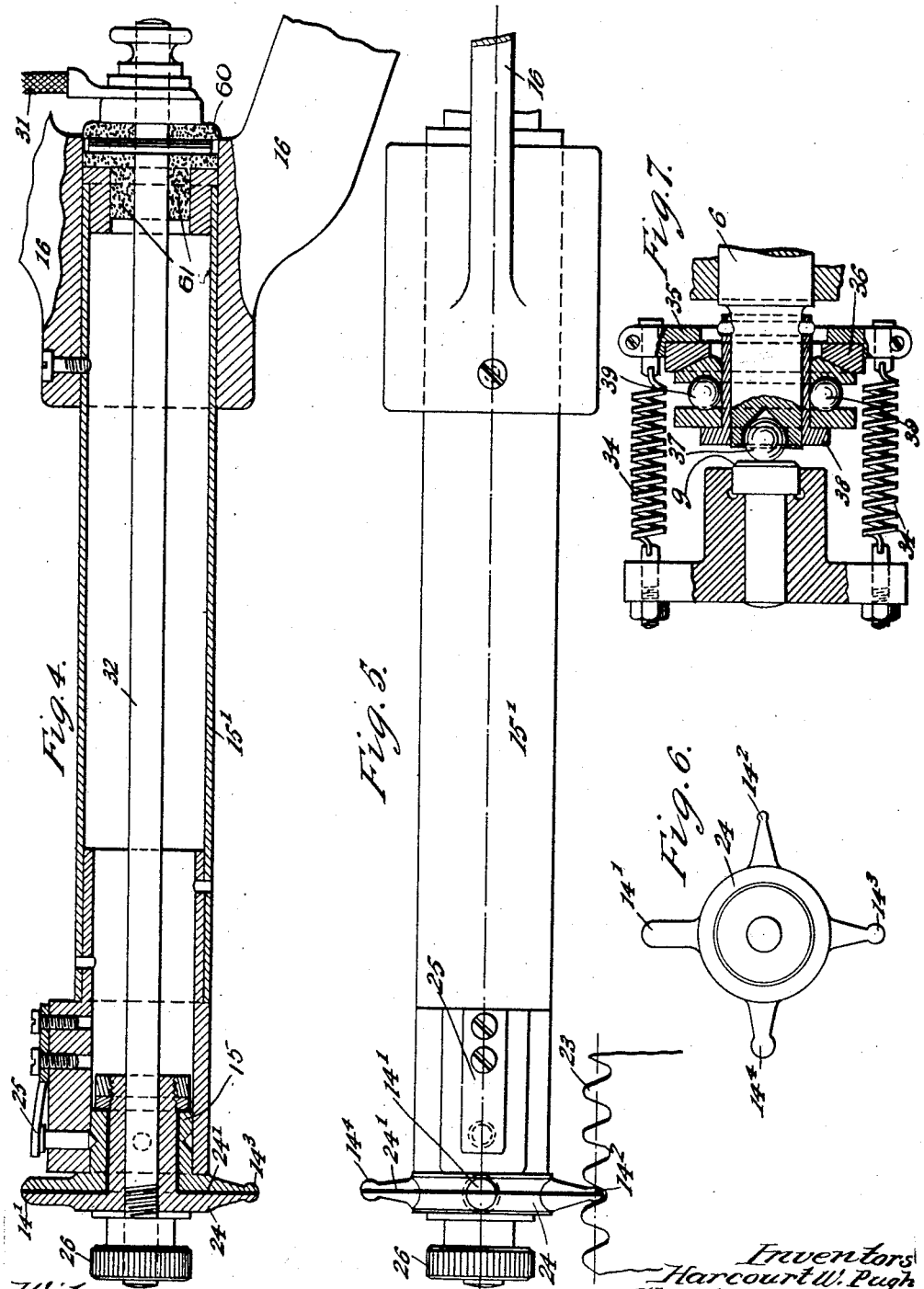

H. W. PUGH AND C. H. VIDAL.
DEVICE FOR TESTING THE PITCH OF SCREWS.
APPLICATION FILED NOV. 20, 1917.
1,332,065. Patented Feb. 24, 1920.
5 SHEETS—SHEET 5.
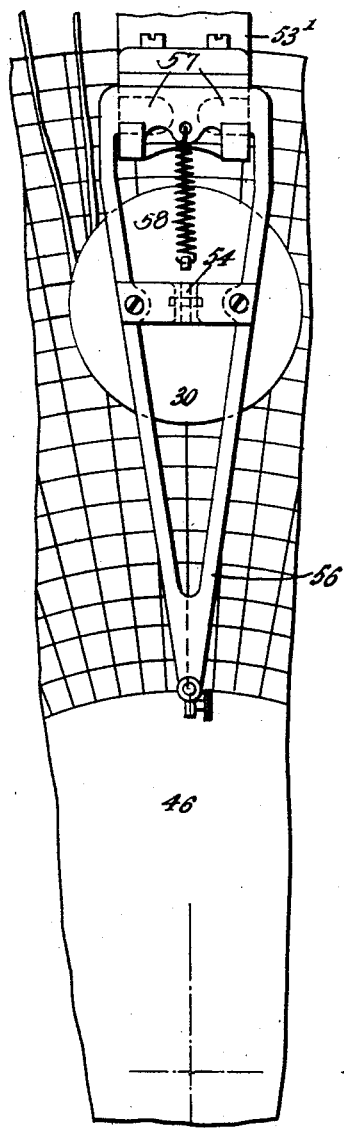
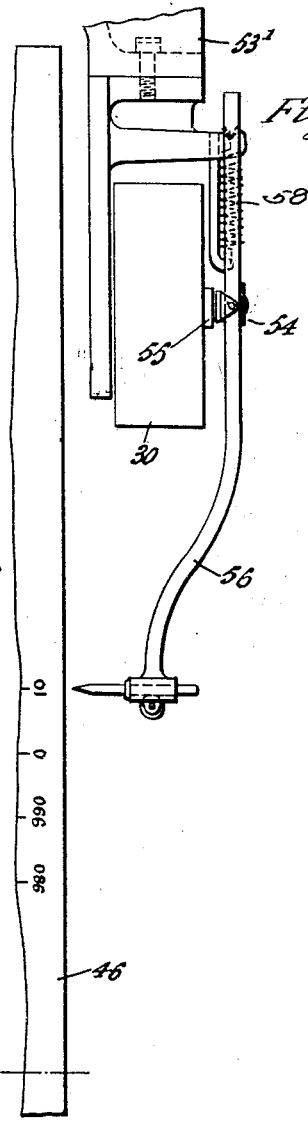
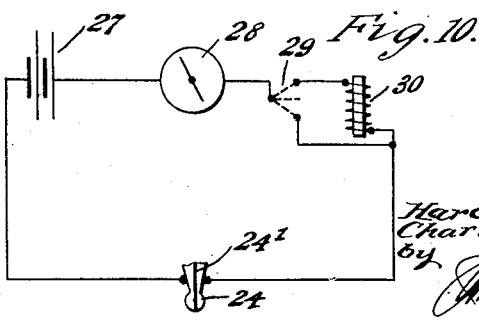

UNITED STATES PATENT OFFICE.

HARCOURT WYNNE PUGH, OF EWELL, AND CHARLES HENRY VIDAL, OF CROYDON, ENGLAND.

DEVICE FOR TESTING THE PITCH OF SCREWS.

1,332,065.    Specification of Letters Patent.    Patented Feb. 24, 1920.

Application filed November 20, 1917. Serial No. 202,975.

*To all whom it may concern:*

Be it known that we, HARCOURT WYNNE PUGH and CHARLES HENRY VIDAL, both subjects of the King of Great Britain, residing, respectively, in Ewell, England, and Croydon, England, have jointly invented certain new and useful Improved Devices for Testing the Pitch of Screws, of which the following is a specification.

The invention relates to means for accurately testing and, if desired, for recording the pitch of the thread at different parts of a screwed surface.

The measurement depends in known manner upon observing the reading of a standard micrometer screw, when a feeling device, comprising a finger of suitable dimensions and rounded end just makes contact with each flank of a V-shaped thread on the screw to be tested. The feeler is suitably attached to a carriage engaging with the thread of the standard screw, and the difference between the readings of the micrometer screw at two consecutive contacts of the feeler gives the pitch of the thread at that part of the screw under test.

According to the invention, electrical means are employed for determining when the feeler is exactly touching each flank of the screw thread, the device is made self-recording and various improvements are introduced to increase the facility of working and the accuracy of the observations.

The feeling device is divided into two parts by a central vertical plane and between these parts is inserted a sheet of paper or other insulating material, which may be glued to each surface.

The rounded end of the feeler is adapted to make contact with each flank of the thread about half way down the depth of the thread, the actual contact being notified by the response of the galvanometer needle, or other indicator, when an electric circuit of low voltage is completed by the conducting metal of the screw bridging the gap formed by the insulating sheet inserted in the feeler. The feeler is attached to a disk, preferably secured to a short spindle at right angles to the plane of the disk, which can be locked in its supports in the required position, and is carried at the end of an arm pivoted to the carriage.

In order to indicate to the operator when the contact is imminent, a low powered microscope attached to the traveling carriage is arranged to show an image of the feeler against an illuminated background.

The distance between two successive points of contact of the feeler is read on the standard micrometer screw, which carries a circular graduated head which by means of a vernier can be read to a hundred thousandth of an inch.

In order to adapt the device to the measurement of screws of different sizes, the disk with the insulating division is provided with several feelers of different gage, any one of which can be brought into use as required. Four feelers will usually be sufficient to cover the range in the dimensions of the screw threads to be tested.

A correction bar of known type with vertical undulations actuates a feeling device for compensating the previously determined errors of the standard screw.

In order that the device shall be self-recording, to a plane face of the micrometer head is attached a disk of cardboard, or the like, on which is a series of concentric circles and radial lines.

A marking device records the observations made and may consists of a pen, pencil or style attracted to the card by an electro-magnet energized in a circuit which is closed when the feeling device touches both flanks of the thread under test.

Figure 2:
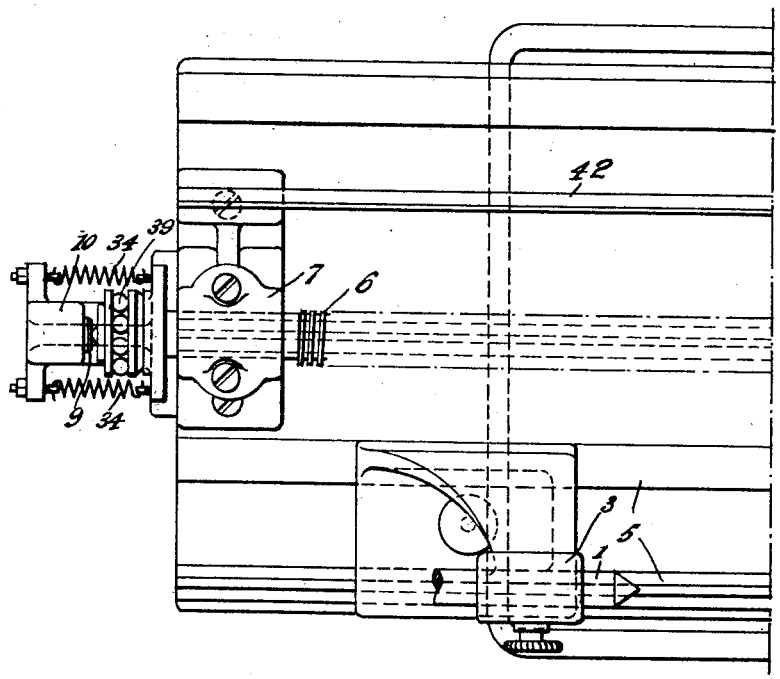

In the accompanying drawings, Figures 1 and 1ª collectively constitute an elevation and Figs. 2 and 2ª a plan of a pitch measuring machine according to the invention; Fig. 3 is a section on the line 3—3 of Fig. 1ª representing a detail of the means for compensating the known errors of pitch of the standard screw; Figs. 4 and 5 show on a larger scale, respectively, in longitudinal section and plan the feeling device; Fig. 6 is a detail of the feeling device; Fig. 7 shows a method of supporting the standard screw in a longitudinal direction; Figs. 8 and 9 show, respectively, in end and side elevation the recording device; Fig. 10 is a diagram illustrating the electric circuit of the feeling device.

The screw to be tested is placed fixedly between centers 1 and 2 mounted in known manner in supports 3 and 4 sliding on rails 5.

The standard screw 6 is supported in bearings 7 and 8 and the end farthest from the micrometer head is held by springs in contact with a hardened steel plate 9 secured to a fixed bracket 10.

A carriage 11 provided with a nut 12 engaging with the thread of the standard screw slides on guide rails 13 and 13' (see Fig. 3) as it advances by the rotation of the standard screw.

Attached to the carriage 11 is the feeling device for testing the screw under examination. In the example shown, four feelers $14^1$, $14^2$, $14^3$, $14^4$ (see Fig. 6) adapted to engage with threads of different sizes, are carried by a short tubular plug 15 (Fig. 4) inserted in a tube 15' mounted in a frame 16 (Fig. $1^a$) which is free to turn in a horizontal plane about knife edges 17 bearing against an arm 18 (Fig. $2^a$) carried by a bar 19 sliding transversely in a carrier 20 which latter is slidably mounted in the carriage 11, a fine adjustment for motion in the same direction being provided by means of the screw 21. The knife edges 17 are held against the arm 18 by a spring 22 secured to the arm 18' and to the frame; the spring also tending to maintain the feeler in contact with the threads 23 of the screw under test when the bar 19 is moved slightly in the direction of the screw after contact has been established.

The head 24 of the plug 15 can be turned so as to bring the appropriate feeler into position to engage with the screw thread 23, its position being indicated by the spring catch 25, and it can be locked in this position by the milled headed screw 26. The head or disk 24 is divided by a central plane and a thin sheet of insulating material 24', such as paper, is inserted between the parts, which are, respectively, connected to leads forming part of an electric circuit shown diagrammatically in Fig. 10. In this diagram 27 is a battery, or other source of electric current, 28 is a galvanometer or other device for indicating when the circuit is completed, 29 is a switch and 30 an electromagnet for operating (as explained later) a recording device. The switch 29 connects either the galvanometer and electromagnet or the galvanometer without the electromagnet to the circuit. This circuit is completed when a feeler is in contact with each flank of the screw thread 23 under test.

A lead 31 (Fig. 4) conveys current from one terminal of the source to a central bolt 32 in conducting connection with one part of the divided disk 24, the other part of which is connected through the tube 15', the frame of the machine, the indicating device 28 and the electromagnet 30 with the other terminal of the source. An insulating washer 60 and an insulating bush 61 are shown in Fig. 4 by the dotted sections. A low powered microscope 33 attached to the carriage 11 shows in the field of view the rounded end of the feeler and the corresponding part of the thread of the screw under test and indicates to the observer when the electric contact is approaching completion.

A device for holding the standard screw 6 in contact with the bracket 10 is shown on a larger scale in Fig. 7. Springs 34 are secured at their rear ends to the bracket 10 and at their front ends to a collar 35 which through a spherical seating 36 transmits the spring pressure to a hardened steel ball 37 inserted in a flanged bush 38 on the end of the screw 6.

The ball 37 is, consequently, held in contact with the hardened steel plate 9. A ball race 39 may be inserted between the seating 36 and the bush 38.

An arm 40 (Fig. 3) engaging in an undulating groove 41 of a compensating plate 42 is attached to a sleeve 43 secured by set screws to the nut 12. The sleeve 43 is rotated in one direction or the other according to the vertical movements imparted to the arm 40. The undulations of the groove 41 shown in Fig. 1 are dimensioned so that the rotation imparted to the arm 40 compensates for the previously determined inaccuracies in pitch of the standard screw at the different parts of its length. The longitudinal travel of the nut is communicated by a saddle-shaped member 44 to the bar 19 and feeling arm 15'.

The member 44 is held against a shoulder 43' of the sleeve 43 by nuts 45 screwed to the sleeve.

The standard screw 6 carries at its front end a large circular disk 46, each division of the graduations on the disk in the example shown corresponding to 5 ten thousandths of an inch. By the aid of a vernier 47 carried by a fixed arm 48, the amount by which the standard screw has been advanced during two consecutive contacts of the feeler with the stationary screw under test can be read upon the graduated edge of the disk to a hundred thousandth of an inch, and the variations of the pitch of the screw under test determined with this accuracy.

The recording device comprises a screw threaded bar 49, which is caused to travel in the direction of a radius of the disk 46 by suitable gearing operated by the revolution of the standard screw. In the example shown, a worm wheel 50 on the standard screw engages with a worm 51. The bar 49 is moved longitudinally in correspondence with the rotation of the worm, which acts as a stationary nut to the threaded bar. The movement of the bar 49 is imparted through a hinge 52 to a slide 53 carrying an arm 53' to which a recording device (Figs. 8 and 9) is attached. The slide 53 consequently moves in a plane parallel to the plane of the disk 46 in correspondence with the rotation imparted to the standard screw, and the arm 53′ is carried from the periphery toward the center of the disk.

When the electromagnet 30 shown diagrammatically in the circuit of Fig. 10 is energized, an iron armature 54 attached to the recording style 56 pivoted at 57 is attracted against the action of a spring 58 to the pole 55 of the magnet 30 when the electric circuit is closed by the contact of the feeler with the thread of the screw under test and records a mark on a sheet of cardboard or the like secured to the disk 46.

The sheet is, preferably, divided as shown in Fig. 8 into a series of radial lines and of concentric circles. It is, preferably, arranged that the recording device is advanced from one circle to the next at each revolution of the standard screw. If a screw of the same pitch as the standard screw was under test and the pitch of the tested screw were perfectly accurate, all the indications would lie on the same radius and any departure from perfect uniformity would be shown at a glance by the positions of the recorded marks relatively to this radius.

If a ring with an internal thread is to be tested, it is either held by a pair of straight edges bearing against the thread and clamped to the external surface of the ring, or, alternatively, the ring may be held against the plane face of a dog chuck.

The operation of testing the accuracy of a screw is as follows: The screw is inserted between the centers 1 and 2; the head 24 of the plug 15 is turned so as to bring a feeler of the form appropriate to the dimensions of the thread of the screw under test into engagement with the thread. The bar 19 is moved so as to bring the feeler in a position approximately over the axis of the screw under test, the bar is then clamped and the final adjustment made by the screw 21.

The carriage 11 is moved so that the feeler engages with the thread at one end of the screw. The reading of the scale on the disk 46 is observed by the aid of the vernier 47, when the galvanometer 28 indicates the passage of a current. If the errors of the screw are to be observed, but not recorded, the switch 29 is set on the lower terminal shown in Fig. 10, by which the electromagnet 30 is cut out of the circuit.

The standard screw 6 is then rotated until the feeler has been moved longitudinally by the carriage 11, so that its end is in contact with each flank of the next thread of the screw 23 as shown in Fig. 5. The circuit of the galvanometer is then again complete, as the insulating material 24′ inserted between the two parts of the head 24 is short circuited by the metal of the screw. The observer looking through the microscope 33 is notified when the contact is imminent. The reading of the scale on the disk 46 is again observed and, assuming that the pitch of the screw under test is intended to be the same as that of the standard screw, the positive or negative errors are indicated at that particular part of the screw by the amount, expressed in hundred thousandths of an inch, by which the reading exceeds or falls short of the former reading. By observing the readings at each successive contact of the feeler, the difference is ascertained between the pitch at every part of the screw under test and that of the standard screw corrected by means of the undulation plate. If the pitch of the screw bears any simple relation to that of the standard, the errors are easily deduced from the consecutive readings of the scale.

If a permanent record is required, the switch 29 is placed on the upper position in which the electromagnet 30 is energized when the electric circuit is completed and attracts the stylus 56.

Having thus described the nature of the said invention and the best means we know of carrying the same into practical effect, we claim:—

1. A machine for measuring the pitch of a screw at any part of its length comprising, in combination, a standard screw with which the screw under test is to be compared, bearings in which the screws are mounted so that their axes are parallel and secured against longitudinal displacement, a carriage engaging with the thread of the standard screw and advanced in correspondence with the rotation imparted thereto, a feeler secured to the carriage and adapted to engage with the threads of the screw under test, means for indicating the amount of rotation of the standard screw corresponding to the distance between the contacts of the feeler with two consecutive threads of the screw under test, a source of electric current, and an electric circuit completed when the feeler is in conducting contact with each flank of a thread of the screw under test.

2. A machine for measuring the pitch of a screw at any part of its length comprising, in combination, a standard screw with which the screw under test is to be compared, bearings in which the screws are mounted so that their axes are parallel and secured against longitudinal displacement, a carriage engaging with the thread of the standard screw and advanced in correspondence with the rotation imparted thereto, a feeler divided in a substantially central plane into two parts, an insulating medium separating said parts, said feeler being secured to the carriage and adapted to engage with the threads of the screw under test, means for indicating the amount of rotation of the standard screw corresponding to the distance between the contacts of the feeler with two consecutive threads of the screw under test, a source of electric current, and an electric circuit completed when the feeler is in conducting contact with each flank of a thread of the screw under test.

3. A machine for measuring the pitch of a screw at any part of its length comprising, in combination, a standard screw with which the screw under test is to be compared, bearings in which the screws are mounted so that their axes are parallel and secured against longitudinal displacement, a carriage engaging with the thread of the standard screw and advanced in correspondence with the rotation imparted thereto, a disk secured to the said carriage and divided in a substantially central plane into two parts electrically insulated from each other, feeler arms of different sizes on said disk, means for bringing any one of said arms into engagement with a thread of the screw under test, means for indicating the amount of rotation of the standard screw corresponding to the distance between the contacts of the feeler with two consecutive threads of the screw under test, a source of electric current, and an electric circuit completed when the feeler is in conducting contact with each flank of a thread of the screw under test.

4. A machine for measuring the pitch of a screw at any part of its length comprising, in combination, a standard screw with which the screw under test is to be compared, bearings in which the screws are mounted so that their axes are parallel and secured against longitudinal displacement, a carriage engaging with the thread of the standard screw and advanced in correspondence with the rotation imparted thereto, a feeler secured to the carriage and adapted to engage with the threads of the screw under test, an electric circuit, a source of electric current, and an indicating device in the said circuit energized when the feeler is in conducting contact with each flank of a thread of the screw under test.

5. A machine for measuring the pitch of a screw at any part of its length comprising, in combination, a standard screw with which the screw under test is to be compared, bearings in which the screws are mounted so that their axes are parallel and secured against longitudinal displacement, a carriage engaging with the thread of the standard screw and advanced in correspondence with the rotation imparted thereto, a feeler secured to the carriage and adapted to engage with the threads of the screw under test, means including a graduated disk secured to the standard screw for indicating the amount of rotation thereof corresponding to the distance between the contacts of the feeler with two consecutive threads of the screw under test, a source of electric current, and an electric circuit completed when the feeler is in conducting contact with each flank of the screw under test.

6. A machine for measuring the pitch of a screw at any part of its length comprising, in combination, a standard screw with which the screw under test is to be compared, bearings in which the screws are mounted so that their axes are parallel and secured against longitudinal displacement, a carriage engaging with the thread of the standard screw and advanced in correspondence with the rotation imparted thereto, a feeler secured to the carriage and adapted to engage with the threads of the screw under test, a graduated disk secured to the standard screw, means for reading said disk, a fixed bracket, a hardened plate secured to the said bracket, a collar on the standard screw, a bush at the end of said screw, a hardened steel ball inserted in the bush, springs inserted between said collar and said bracket adapted to hold the ball in contact with the plate, a source of electric current, and an electric circuit completed when the feeler is in conducting contact with each flank of a thread of the screw under test.

7. A machine for measuring the pitch of a screw at any part of its length comprising, in combination, a standard screw with which the screw under test is to be compared, bearings in which the screws are mounted so that their axes are parallel and secured against longitudinal displacement, a carriage engaging with the thread of the standard screw and advanced in correspondence with the rotation imparted thereto, a feeler secured to the carriage and adapted to engage with the threads of the screw under test, a graduated disk secured to the standard screw, a slide moved in correspondence with the rotation of said screw in a direction parallel to the radius of the disk, record receiving means on the disk, an arm carried by the slide, a style carried by the arm, and means to actuate said style to record a mark on the said record receiving means when said feeler is in conducting contact with each flank of a thread of the screw under test.

8. A machine for measuring the pitch of a screw at any part of its length comprising, in combination, a standard screw with which the screw under test is to be compared, bearings in which the screws are mounted so that their axes are parallel and secured against longitudinal displacement, a carriage engaging with the thread of the standard screw and advanced in correspondence with the rotation imparted thereto, a feeler secured to the carriage and adapted to engage with the threads of the screw under test, a graduated disk secured to the standard screw, a slide moved in correspondence with the rotation of said screw in a direction parallel to the radius of the disk, a record receiving member on the disk, an arm carried by the slide, a style carried by the arm, an iron armature in the arm, a source of current, and an electro-magnet energized by said source and attracting said armature when the feeler makes conducting contact with each flank of a thread of the screw under test.

9. A machine for measuring the pitch of a screw at any part of its length comprising, in combination, a standard screw with which the screw under test is to be compared, bearings in which the screws are mounted so that their axes are parallel and secured against longitudinal displacement, a carriage, a nut on the carriage engaging with the thread of the standard screw, a sleeve secured to the nut, a plate with undulations adapted to compensate for the known errors of the standard screw, an arm on the nut engaging with the said undulations, a feeler secured to the carriage and adapted to engage with the threads of the screw under test, means for indicating the amount of rotation of the standard screw corresponding to the distance between the contacts of the feeler with two consecutive threads of the screw under test, a source of electric current, and an electric circuit completed when the feeler is in conducting contact with each flank of a thread of the screw under test.

In testimony whereof we have signed our names to this specification in the presence of two subscribing witnesses.

HARCOURT WYNNE PUGH.
CHARLES HENRY VIDAL.

Witnesses:
C. L. HOPKINS,
B. W. DURHAM.